(12) United States Patent
Scott

(10) Patent No.: US 7,511,945 B2
(45) Date of Patent: Mar. 31, 2009

(54) ELECTRICAL DISTRIBUTION SYSTEM

(76) Inventor: Robert Peter Bernard Scott, 73 East St., South Salem, NY (US)

( * ) Notice: Subject to any disclaimer, the term of this patent is extended or adjusted under 35 U.S.C. 154(b) by 358 days.

(21) Appl. No.: 11/419,826

(22) Filed: May 23, 2006

(65) Prior Publication Data
US 2007/0297110 A1 Dec. 27, 2007

(51) Int. Cl.
*H02B 1/01* (2006.01)
(52) U.S. Cl. ........................ 361/627; 361/634
(58) Field of Classification Search ................ 361/634, 361/627
See application file for complete search history.

(56) References Cited

U.S. PATENT DOCUMENTS

2004/0001303 A1* 1/2004 Doblar et al. ............... 361/601

* cited by examiner

*Primary Examiner*—Jayprakash N Gandhi
*Assistant Examiner*—Zachary M Pape

(57) ABSTRACT

An electrical distribution system includes a distribution board having input connectors for live and neutral lines from an electricity supply and an earth line; and a plurality of circuit breakers connected to the live line, characterized in that the distribution board has a plurality of three-terminal output connectors, each output connector being wired to the neutral and earth lines and to a power output line of a respective circuit breaker, the output connectors being engageable with complimentary connectors for the distribution of electrical energy from the distribution board.

4 Claims, 4 Drawing Sheets

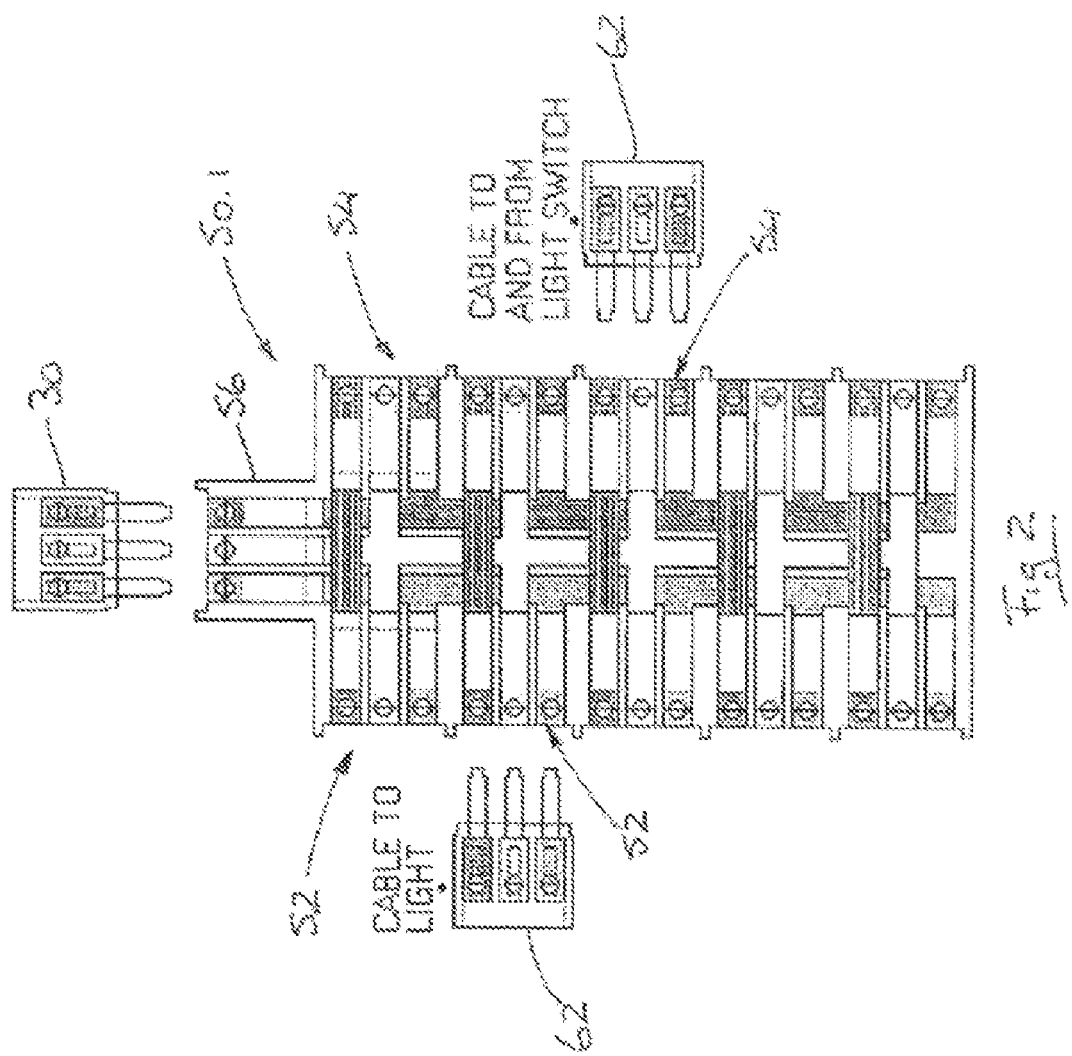

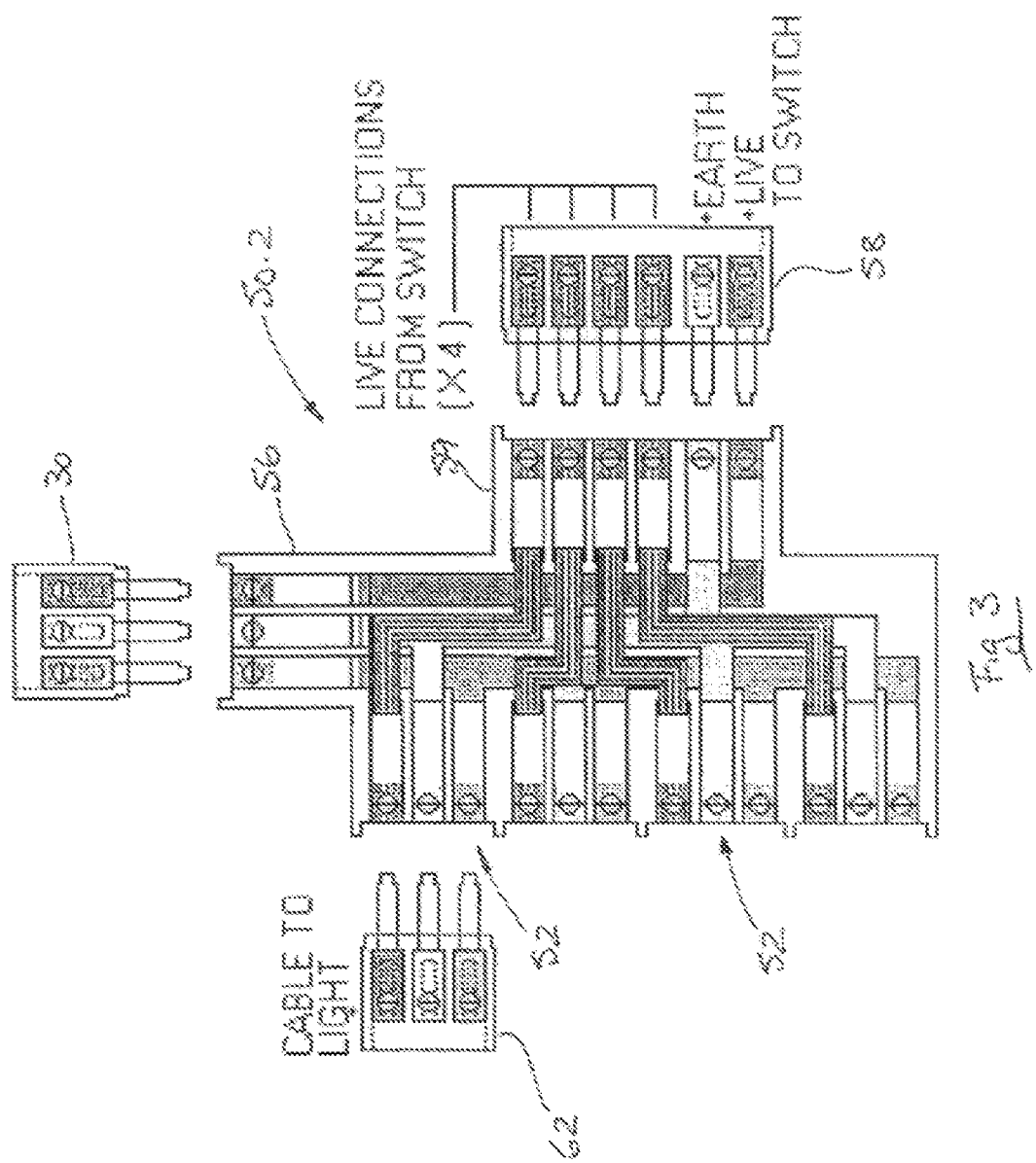

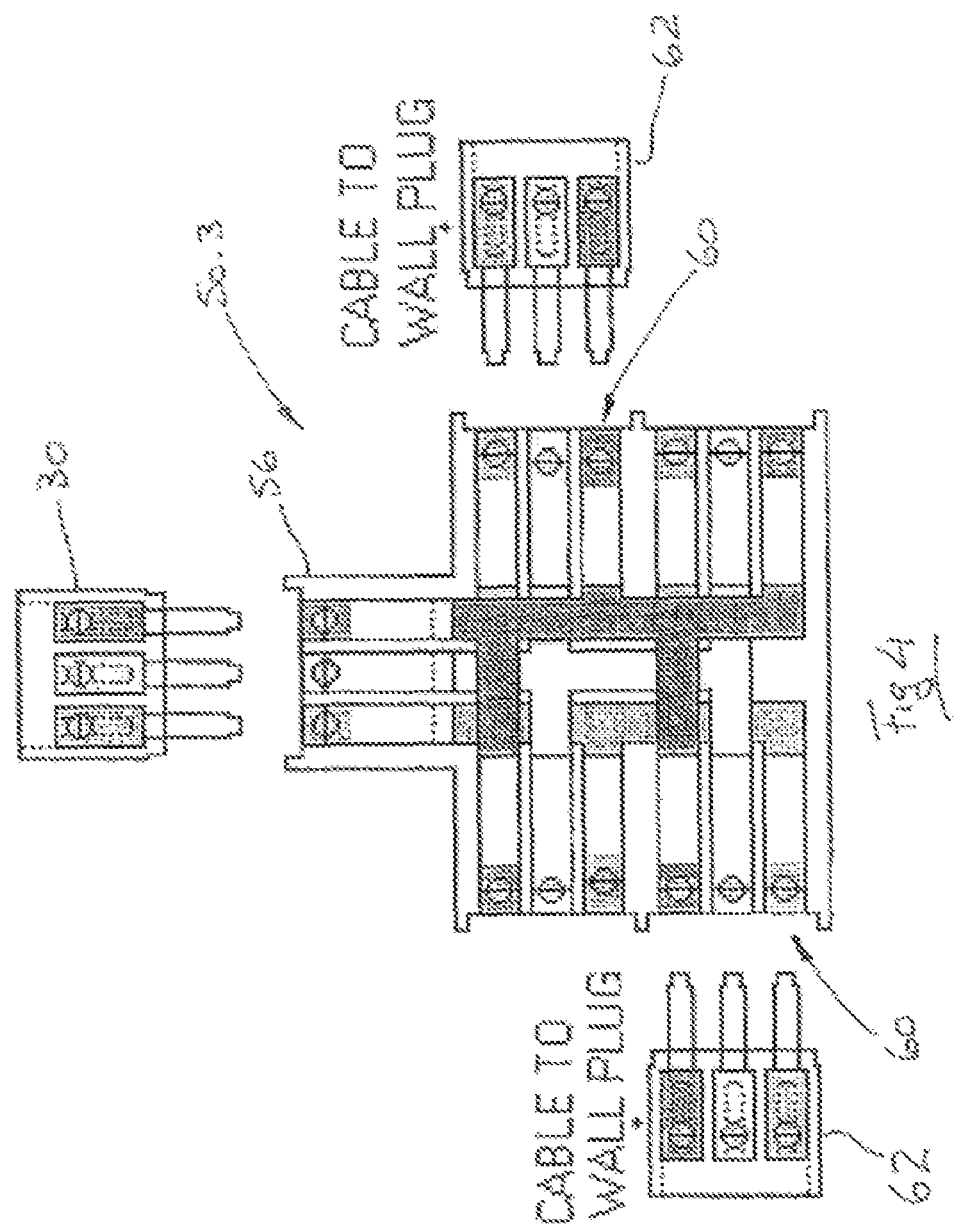

ELECTRICAL DISTRIBUTION SYSTEM

FIELD OF THE INVENTION

This invention relates to the distribution of electrical energy. More particularly, the invention relates to an electrical distribution system for the distribution of electrical energy in home and industrial applications.

BACKGROUND TO THE INVENTION

Commonly, households and industrial facilities are wired for the distribution to electrical energy. Electrical energy is provided from an electrical utility via a reticulation system, which generally provides power at a nominal voltage via at least a live and neutral line. These lines are fed to an electrical distribution board on the premises. In addition, the distribution board is commonly provided with an earth line, enabling the used of earth leakage systems. Generally, where an earth leakage system is in place, the live and neutral lines together with an earth line are connected to an earth leakage unit and mains isolator. The live line is connected to a busbar bridging a number of circuit breakers. These circuit breakers are rated in amps and, commonly, a specified maximum number of connections, either to light fittings or wall plugs, are permitted to be fed from a circuit breaker of a specified amperage. Commonly, separate live, neutral and earth cables are led from the distribution box to each specified appliance or connector for which the premises are wired. This generates a spider web of cables in the distribution board and in the loft or ceiling area of the facility, where the wiring for the premises is hidden, as well as in the conduits leading from the distribution board to the loft or ceiling.

Accordingly, it would be an advantage to provide and electrical distribution system to facilitate the neat wiring of premises, to reduce the number of cables running from the distribution board throughout the premises serviced by the board and to provide a simple means for limiting the number of connections from a specified circuit breaker, in accordance with laid down regulations.

OBJECT OF THE INVENTION

It is an object of the invention to provide and electrical distribution system, which will, at least partially, alleviate the abovementioned problems and achieve the advantages set out.

SUMMARY OF THE INVENTION

According to a first aspect of the invention there is provided and electrical distribution system including a distribution board having input connectors for live and neutral lines from an electricity supply and an earth line; and a plurality of circuit breakers connected to the live line, characterized in that the distribution board has a plurality of three-terminal output connectors, each output connector being wired to the neutral and earth lines and to a power output line of a respective circuit breaker, the output connectors being engageable with complimentary connectors for the distribution of electrical energy from the distribution board.

Each of the circuit breakers may be rated for a specified number of connections to preselected electrical devices from that circuit breaker and in which the system includes a plurality of multiple adaptors, each adaptor having an input connector for connection to a respective output connector of the distribution board and a number of output connectors corresponding to the number of electrical devices specified for connection to the circuit breaker associated with that output connector. Then, the electrical devices may be selected from a group comprising electric lights, electric plugs and electric geysers. Thus, it will be appreciated that by means of the multiple adaptors, the maximum number of facilities connectable to a respective circuit breaker may be limited to the maximum number specified for a circuit breaker rated at a particular amperage.

According to a further aspect of the invention there is provided and electrical distribution system including a distribution board having input connectors for live and neutral lines from an electricity supply and an earth line; and a plurality of circuit breakers connected to the live line, each of the circuit breakers being rated for a number of connections to preselected electric devices from that circuit breaker; and a plurality of multiple adaptors, each multiple adaptor being connected to the neutral and earth lines of the distribution board and to the live output line of a respective circuit breaker, characterized in that each of the multiple adaptors has a number of output connectors corresponding to the number of electrical devices rated for connection to the circuit breaker associated with the multiple adaptor.

BRIEF DESCRIPTION OF THE DRAWINGS

The invention is now described, by way of example only, with reference to the accompanying diagrammatic drawings.

In the drawings.

FIG. 2 shows a schematic view multi-connector adapter for lights and light switches, for used with the distribution board of FIG. 1;

FIG. 3 shows a schematic view of a four-switch multi-light connector for use with distribution board of FIG. 1; and FIG. 4 shows a multi-connector for wall plugs, for use with the distribution board of FIG. 1.

DETAILED DESCRIPTION OF THE DRAWINGS

Figure 1:
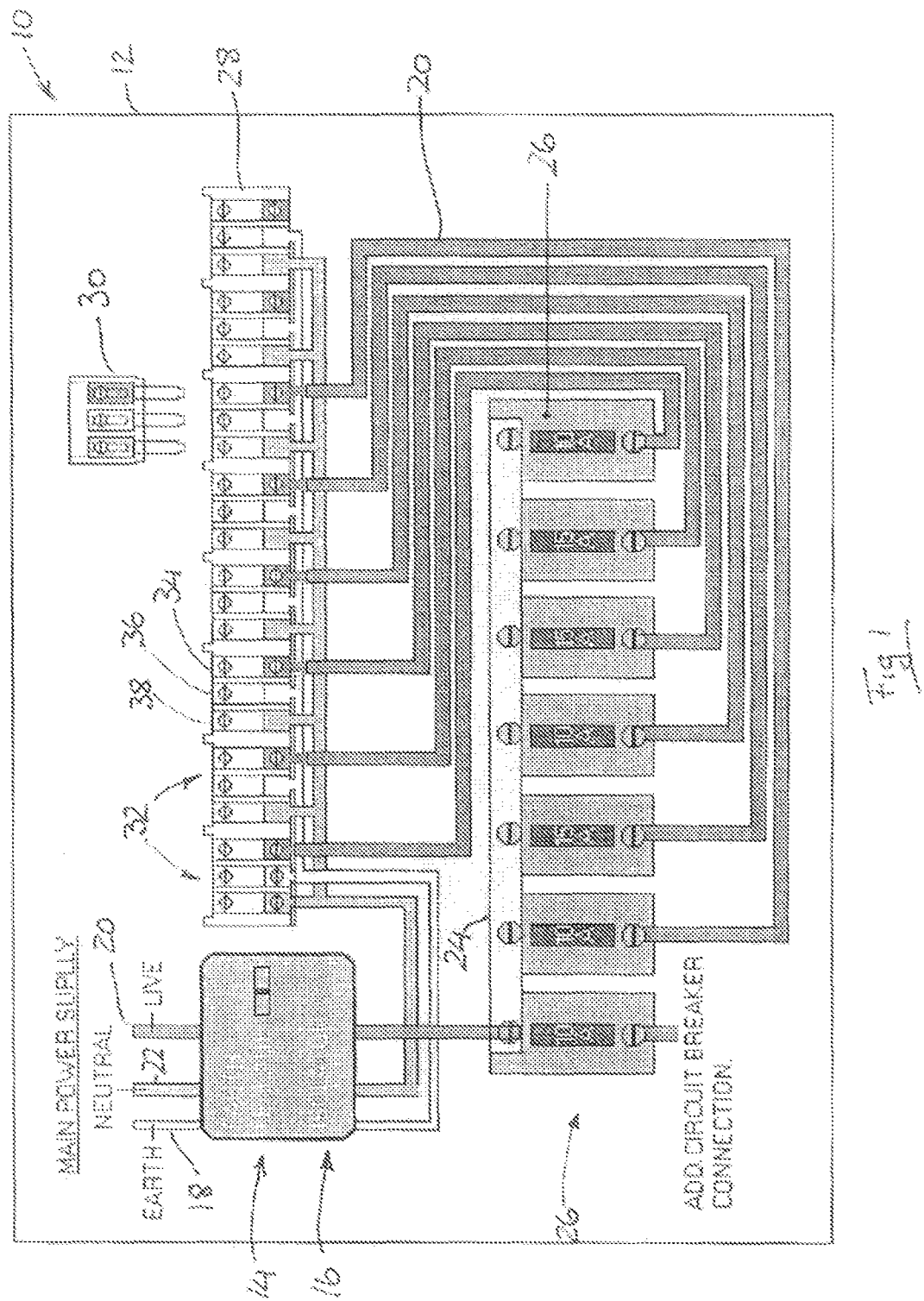
FIG. 1 shows a schematic view of an electrical distribution system, in accordance with the invention.

In FIG. 1, reference numeral 10 generally indicates an electrical distribution system in accordance with the invention.

The system 10 comprises a distribution board 12 having an earth leakage system 14 and mains isolator 16 to which are connected an earth line 18 and live and neutral lines, 20 and 22 respectively, received from an electrically utility. Such lines supply electricity at a nominal voltage of, say, 220 to 240 volts AC. From the mains isolator 16 the live line 20 is connected to a busbar 24 to which are attached seven circuit breakers 26, four of which are rated at 10 amps, and three of which are rated at 15 amps. Six of the live lines from the output side of the circuit breakers are shown connected to a multi-connector 28 having, in this embodiment, facility for the connection of eight connector plugs 30, only six of which are used in this embodiment. The facilities for connection to the connector plugs 30 comprise eight socket sets 32. Each of the sockets sets 32 of the multi-connector has a socket 34 for the connection of the live line 20 from one of the circuit breakers 26 and sockets 36 and 38 for connection to the earth and neutral lines, 18 and 22 respectively, fed directly from the mains isolator 16.

The individual connector plugs 30 are each wired for earth, neutral and live lines. In a preferred embodiment of the invention, a single cable is led from each of the connector plugs 30 via a conduit (not shown) into a ceiling of the premises to be wired. In this way, it will be appreciated that the wiring of the distribution board 12 is simple and neat.

Each of the connector plugs 30 is connected to an adaptor 50 housed in the ceiling or loft of the premises. Preferably, the adaptors 50 are configured to permit only a specified number of connections of either light switchers or wall plugs, the number of connections being determined by the rating of the circuit breaker 26 associated with the socket set 32 to which the adaptor 50 is connected. Thus, in the case of South Africa, it is permitted to connected up to four wall plugs to a 30 amp circuit breaker, and correspondingly fewer wall plugs from a lower rated circuit breaker, while up to five light fittings may be connected to a 10 amp circuit breaker or up to 10 light fittings to a 15 amp circuit breaker. Thus, the adaptor 50.1 shown in FIG. 2 provides for the connection of five light fittings and their associated light switcher, via five light output sockets 52 and five switch output sockets 54 and is connected to a plug adaptor 30 by means of an input socket 56. Similarly, the adaptor 50.2 shown in FIG. 3 provides for the connection of four light fittings via four light output sockets 52, but in this case a single four switch connector 58 co-operates with a complimentary four switch socket 59. In FIG. 4, an adaptor 50.3 is shown for the connection of a 30 amp circuit breaker to four wall plugs via wall plug outlet sockets 60.

In each case, the adaptor 50 provides a plurality of sockets 52, 54, 59 60, each of which may be mated with an appropriately configured complimentary plug unit 62, 62, 58 and 62 respectively. The plugs 58, 62 and sockets 52,54,59,60 are configured in such a way that the plugs many only be fitted in a single orientation into a respective socket, thereby providing a safety feature to prevent the incorrect matching of live and neutral lines. Further, the plugs and sockets are colour coded as a further protection against incorrect wiring.

The invention provides for an electrical distribution system which will facilitate the wiring of domestic and industrial premises and largely do away with a complicated web or wires. Further, safety is enhanced by the use of connectors which will permit only the correct number of connections to a circuit breaker of a specified rating.

The invention claimed is:

1. An electrical distribution system including
   a distribution board having input connectors for live and neutral lines from an electricity supply and an earth line; and a plurality of circuit breakers connected to the live line, characterized in that
   the distribution board has a plurality of three-terminal output connectors, each output connector being wired to the neutral and earth lines and to a power output line of a respective circuit breaker, the output connectors being engageable with complimentary connectors for the distribution of electrical energy from the distribution board.

2. The electrical distribution system as claimed in claim 1, in which each of the circuit breakers is rated for a specified number of connections to preselected electrical devices from that circuit breaker and in which the system includes a plurality of multiple adaptors, each adaptor having an input connector for connection to a respective output connector of the distribution board and a number of output connectors corresponding to the number of electrical devices specified for connection to the circuit breaker associated with that output connector.

3. The electrical distribution system as claimed in claim 2, in which the electrical devices are selected from a group comprising electric lights, electric plugs and electric geysers.

4. An electrical distribution system including
   a distribution board having connectors for live and neutral lines from an electricity supply and an earth line; and
   a plurality of circuit breakers connected to the live line, each of the circuit breakers being rated for a number of connections to preselected electric devices from the circuit breaker; and
   a plurality of multiple adaptors, each multiple adaptor being connected to the neutral and earth lines of the distribution board and to the live output line of a respective circuit breaker, characterized in that
   each of the multiple adaptors has a number of output connectors corresponding to the number of electrical devices rated for connection to the circuit breaker associated with the multiple adaptor.

* * * * *